United States Patent
Kitamura

(10) Patent No.: US 10,483,038 B2
(45) Date of Patent: Nov. 19, 2019

(54) MULTILAYER CERAMIC CAPACITOR AND MANUFACTURING METHOD OF MULTILAYER CERAMIC CAPACITOR

(71) Applicant: TAIYO YUDEN CO., LTD., Chuo-ku, Tokyo (JP)

(72) Inventor: Shohei Kitamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/908,498

(22) Filed: Feb. 28, 2018

(65) Prior Publication Data

US 2018/0336999 A1 Nov. 22, 2018

(30) Foreign Application Priority Data

May 16, 2017 (JP) .................. 2017-097510
Jan. 19, 2018 (JP) .................. 2018-006930

(51) Int. Cl.
*H01G 4/008* (2006.01)
*H01G 4/30* (2006.01)
*H01G 4/12* (2006.01)
*H01G 4/232* (2006.01)
*H01G 4/012* (2006.01)
*H01G 4/248* (2006.01)

(52) U.S. Cl.
CPC .......... *H01G 4/0085* (2013.01); *H01G 4/012* (2013.01); *H01G 4/1227* (2013.01); *H01G 4/232* (2013.01); *H01G 4/30* (2013.01); *H01G 4/248* (2013.01)

(58) Field of Classification Search
CPC ........ H01G 4/30; H01G 4/012; H01G 4/1227; H01G 4/2325; H01G 4/0085; H01G 4/232; H01G 4/248

USPC ......................................... 361/305
See application file for complete search history.

(56) References Cited

U.S. PATENT DOCUMENTS

2004/0179326 A1* 9/2004 Hattori .............. H01G 4/008
                                                      361/320
2013/0049532 A1* 2/2013 Kim ................. H01G 4/30
                                                     310/311

(Continued)

FOREIGN PATENT DOCUMENTS

JP      2013229555 A   11/2013
JP      2014082435 A    5/2014

OTHER PUBLICATIONS

Non-Final Office Action issued by U.S. Patent and Trademark Office, dated Mar. 29, 2019, for U.S. Appl. No. 15/908,519. (15 pages).

(Continued)

*Primary Examiner* — Michael P McFadden
(74) *Attorney, Agent, or Firm* — Law Office of Katsuhiro Arai

(57) ABSTRACT

A multilayer ceramic capacitor includes: a multilayer structure in which each of dielectric layers and each of internal electrode layers are alternately stacked, a main component of the dielectric layers being ceramic, a main component of the internal electrode layers being a metal, wherein: at least one of the internal electrode layers includes grains of which a main component is ceramic; and an area ratio of a total area of the grains in a cross section of the at least one of the internal electrode layers in a stacking direction of the dielectric layers and the internal electrode layers is 10% or more.

12 Claims, 8 Drawing Sheets

(56) References Cited

U.S. PATENT DOCUMENTS

2013/0286539 A1 10/2013 Kim et al.
2014/0104748 A1 4/2014 Park et al.
2014/0240898 A1 8/2014 Kim et al.
2018/0336998 A1 11/2018 Kitamura

OTHER PUBLICATIONS

Final Office Action issued by U.S. Patent and Trademark Office, dated Aug. 23, 2019, for related U.S. Appl. No. 15/908,519. (12 pages).

* cited by examiner

FIG. 7

| | AVERAGE GRAIN DIAMETER OF Ni | AVERAGE GRAIN DIAMETER OF CO-MATERIAL | SPEED OF TEMPERATURE INCREASING [°C/MINUTE] | CONTINUITY MODULUS | AREA RATIO (%) | DIELECTRIC CONSTANT |
|---|---|---|---|---|---|---|
| EXAMPLE 1 | 70nm | 8.6nm | 30 | 100% | 12.0 | 80 |
| EXAMPLE 2 | 70nm | 8.6nm | 45 | 100% | 14.5 | 95 |
| EXAMPLE 3 | 70nm | 8.6nm | 55 | 100% | 16.2 | 100 |
| EXAMPLE 4 | 70nm | 8.6nm | 65 | 100% | 17.3 | 98 |
| EXAMPLE 5 | 70nm | 8.6nm | 80 | 100% | 18.0 | 93 |
| COMPARATIVE EXAMPLE 1 | 120nm | 29nm | 45 | 95% | 7.0 | 70 |
| COMPARATIVE EXAMPLE 2 | 120nm | 29nm | 55 | 96% | 8.7 | 80.1 |
| COMPARATIVE EXAMPLE 3 | 120nm | 29nm | 65 | 94% | 9.0 | 82 |

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2017-097510, filed on May 16, 2017 and the prior Japanese Patent Application No. 2018-006930, filed on Jan. 19, 2018, the entire contents of which are incorporated herein by reference.

FIELD

A certain aspect of the present invention relates to a multilayer ceramic capacitor and a manufacturing method of a multilayer ceramic capacitor.

BACKGROUND

Recently, electronic devices such as smart phones or mobile phones are being downsized. Thereby, electronic components mounted on the electronic devices are rapidly being downsized. For example, in a field of multilayer ceramic capacitors, although property is secured, thicknesses of dielectric layers and internal electrode layers are reduced in order to reduce a chip size.

However, a sintering temperature of a metal of the internal electrode layer is different from that of a ceramic of the dielectric layers. Therefore, there is a problem that a continuity modulus of the internal electrode layers after sintering becomes lower. When the thicknesses of the internal electrode layers are reduced, the continuity modulus may be further reduced. And so, in order to achieve delaying of contraction, a ceramic co-material is added to the internal electrode layers (for example, see Japanese Patent Application Publication No. 2014-082435).

SUMMARY OF THE INVENTION

The co-material tends to diffuse to the dielectric layers in the sintering. It is therefore difficult to sufficiently reduce the continuity modulus of the internal electrode layers.

The present invention has a purpose of providing a multilayer ceramic capacitor and a manufacturing method of a multilayer ceramic capacitor that are capable of suppressing reduction of internal electrode layers.

According to an aspect of the present invention, there is provided a multilayer ceramic capacitor including: a multilayer structure in which each of dielectric layers and each of internal electrode layers are alternately stacked, a main component of the dielectric layers being ceramic, a main component of the internal electrode layers being a metal, wherein: at least one of the internal electrode layers includes grains of which a main component is ceramic; and an area ratio of a total area of the grains in a cross section of the at least one of the internal electrode layers in a stacking direction of the dielectric layers and the internal electrode layers is 10% or more.

According to another aspect of the present invention, there is provided a manufacturing method of a multilayer ceramic capacitor including: a first step of forming a pattern of a metal conductive paste on a green sheet including ceramic powders, a main component of the metal conductive paste being metal powders of which an average grain diameter is 100 nm or less and of which a standard deviation of grain size distribution is 1.5 or less, the metal conductive paste including ceramic powders as a co-material, an average grain diameter of the co-material being 10 nm or less, a standard deviation of grain size distribution of the co-material being 5 or less; and a second step of forming internal electrode layers by sintering the metal powders and forming dielectric layers by sintering the ceramic powders of the green sheet, by baking a ceramic multilayer structure obtained by stacking a plurality of layer units obtained by the first step, wherein: at least one of the internal electrode layers includes grains of which a main component is ceramic; and an area ratio of a total area of the grains in a cross section of the at least one of the internal electrode layers in a stacking direction of the dielectric layers and the internal electrode layers is 10% or more.

BRIEF DESCRIPTION OF THE DRAWINGS

FIG. 7 illustrates results of examples and comparative examples; and

DETAILED DESCRIPTION

A description will be given of an embodiment with reference to the accompanying drawings.
[Embodiment]

Figure 1:
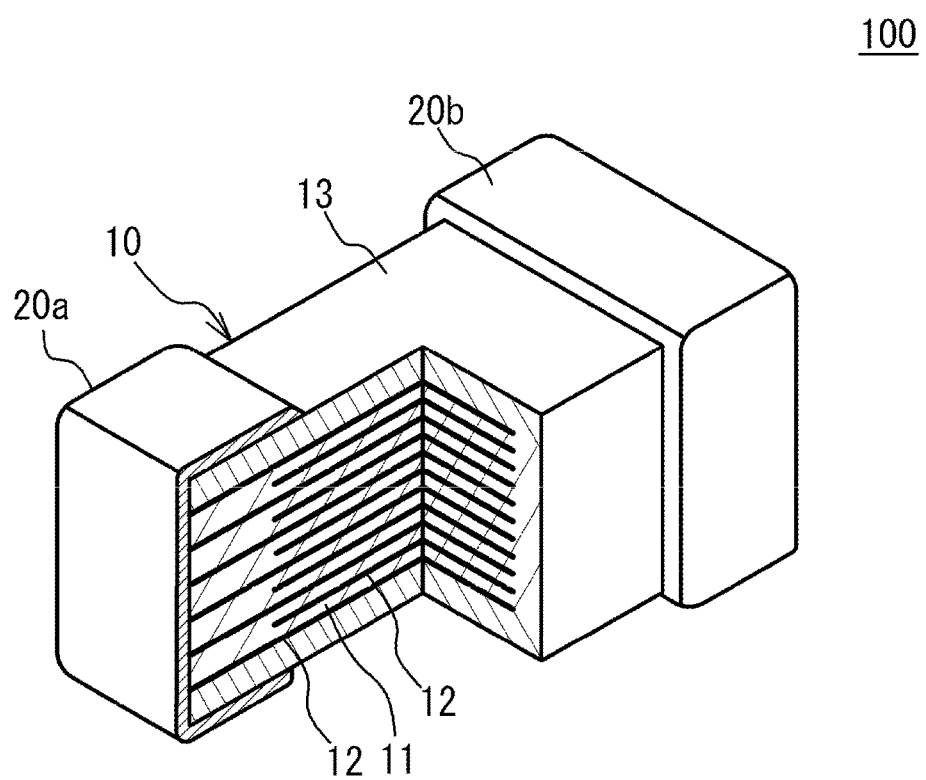
FIG. 1 illustrates a partial perspective view of a multilayer ceramic capacitor.

FIG. 1 illustrates a partial perspective view of a multilayer ceramic capacitor 100 in accordance with an embodiment. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in the stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.2 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. A thickness of the internal electrode layer 12 is, for example, 0.5 µm or less. It is preferable that the thickness of the internal electrode layer 12 is 0.3 µm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

For the purpose of downsizing the multilayer ceramic capacitor 100 and enlarging the capacity of the multilayer ceramic capacitor 100, reduction of thicknesses of the dielectric layer 11 and the internal electrode layer 12 is demanded. However, when the thickness of the internal electrode layer 12 is reduced, it is difficult to maintain a high continuity modulus. The reasons are as follows. In a case where the internal electrode layer 12 is formed by sintering a metal powder, when the sintering progresses, the metal powder tends to be spheroidized in order to minimize surface energy. The metal component of the internal electrode layer 12 is sintered earlier than the main component ceramic of the dielectric layer 11. Therefore, when the temperature is increased to a value at which the main component ceramic of the dielectric layer 11 is sintered, the metal component of the internal electrode layer 12 is excessively sintered and tends to be spheroidized. In this case, when there is a reason (defect) of break, the internal electrode layer 12 is broken from the defect and the continuity modulus decreases. When the thicknesses of the dielectric layers 11 and the internal electrode layers 12 are further reduced, the continuity modulus may be further reduced.

And so, it is thought that a co-material of which a main component is ceramic is added to the internal electrode layer 12, and the contraction of the internal electrode layer 12 is delayed. However, the co-material is extruded into the dielectric layer 11 because of diffusion during the sintering, it is difficult to suppress the reduction of the continuity modulus. When the co-material is absorbed in the dielectric layer 11, a shifting of an A/B ratio (a ratio of A site and B site of perovskite), a shifting of a composition ratio may occur. And the dielectric constant ε may be different from a designed value. A target capacity may not be necessarily achieved.

Figure 2:
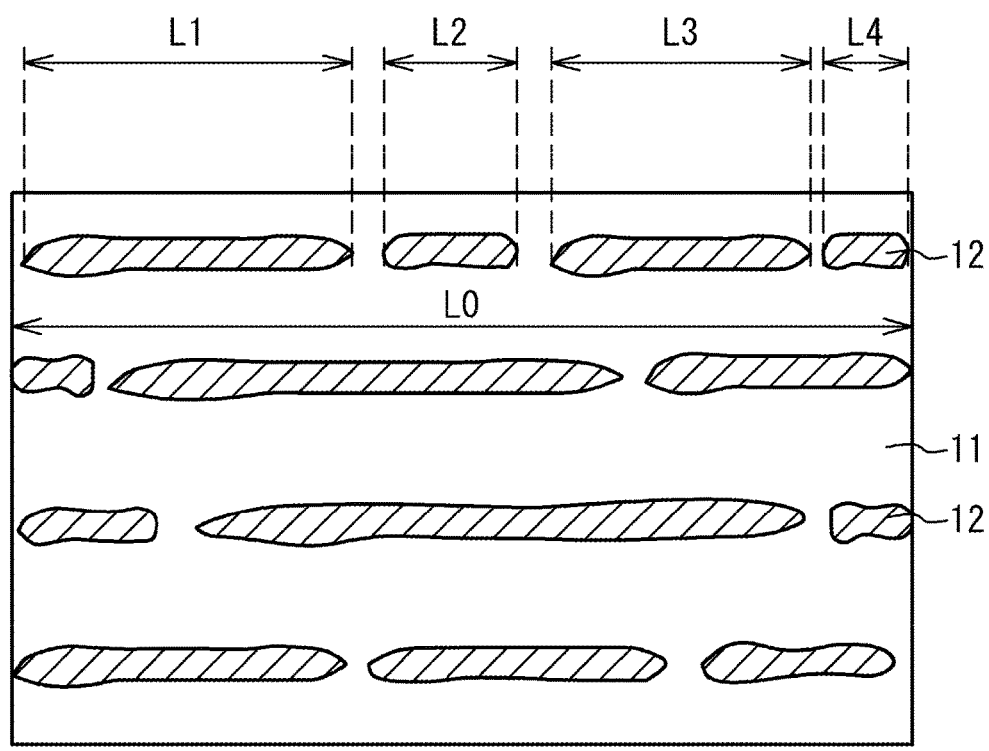
FIG. 2 illustrates a continuity modulus.

FIG. 2 illustrates the continuity modulus. As illustrated in FIG. 2, in an observation area having a length L0 in the internal electrode layer 12, lengths L1, L2 to Ln of metal portions are measured and summed. A ratio of the metal portions $\Sigma Ln/Lo$ can be defined as the continuity modulus.

Figure 3A:
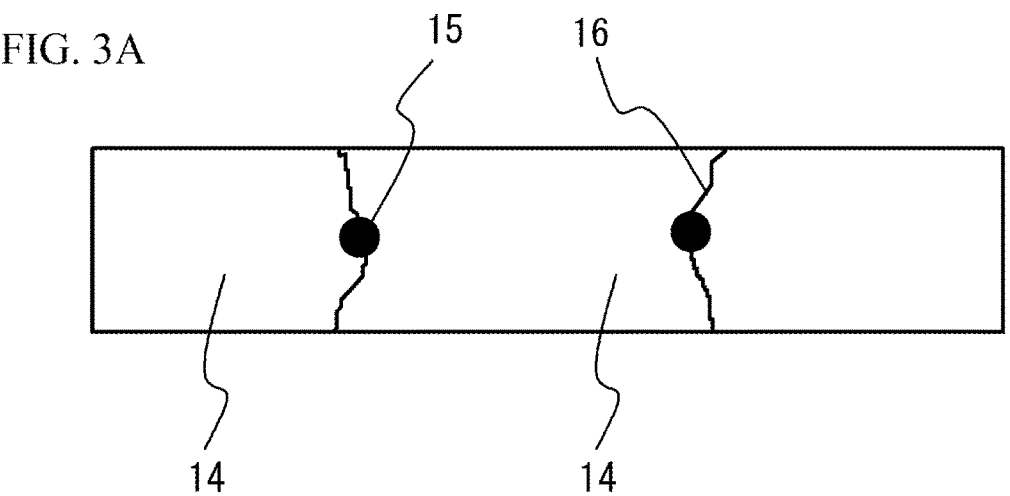
FIG. 3A illustrates an internal electrode layer in a case where a crystal grain diameter is large.
Figure 3B:
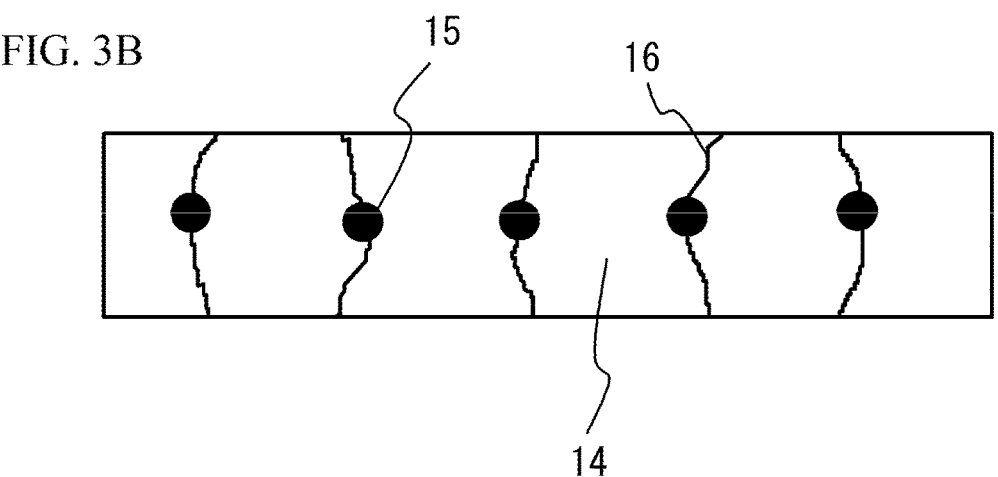
FIG. 3B illustrates an internal electrode layer in a case where a crystal grain diameter is small.

And so, in the embodiment, a crystal grain diameter of the internal electrode layer 12 is small. FIG. 3A illustrates the internal electrode layer 12 in a case where the crystal grain diameter is large. FIG. 3B illustrates the internal electrode layer 12 in a case where the crystal grain diameter is small. As illustrated in FIG. 3A and FIG. 3B, when a crystal grain 14 is small, a co-material tends to exist in the internal electrode layer 12. For example, when the crystal grain 14 gets smaller, the number of crystal grain boundaries 16 gets larger. When the co-material is left in the crystal grain boundary 16, it is thought that the number of grains 15 of which a main component is ceramic is large, in a whole of the internal electrode layer 12. When the number of the left co-materials is large, the diameter of each grain 15 is large. In concrete, in a cross section of the internal electrode layer 12 in a stacking direction of the dielectric layer 11 and the internal electrode layer 12, an area ratio of the grains 15 is 10% or more. For example, the cross section is a cross section in a plane that is determined by the stacking direction of the dielectric layer 11 and the internal electrode layer 12 and a facing direction of the external electrodes 20a and 20b. With the structure, the number of the left co-material in the whole of the internal electrode layer 12 is large. In this case, excessive sintering of a metal component of the internal electrode layer 12 during sintering is suppressed. And a breaking of the internal electrode layer 12 is suppressed. Therefore, a continuity modulus of the internal electrode layer 12 becomes larger. And, diffusion of the co-material toward the dielectric layers 11 is suppressed. Shifting of an A/B ratio and a composition of the material of the dielectric layers 11 are suppressed. Reduction of the dielectric constant ε is suppressed. Thus, desirable dielectric property can be achieved. Accordingly, degradation of bias property is suppressed, and a high capacity can be achieved. It is preferable that the area ratio is 12% or more. It is more preferable that the area ratio is 14% or more. The area ratio may be calculated from a total area of 10 internal electrode layers 12 that are arbitrarily selected and a total area of the grains 15 in the 10 internal electrode layers 12, with use of a SEM image of the cross section of the internal electrode layer 12. Because of a manufacturing error or the like, variability may occur in the area ratio between different two internal electrode layers 12. However, when the area ratio is calculated with use of the arbitrarily selected 10 internal electrode layers 12, it is possible to suppress the variability. The area may be calculated with use of an image analysis software.

When the co-materials do not diffuse into the dielectric layers 11 and a sufficient amount of the co-materials are left in the internal electrode layer 12, the co-materials are collected in the internal electrode layer 12. In concrete, a co-material near the center of the internal electrode layer 12 collects co-materials around the co-material, and a grain growth may occur. As a result, the growth co-materials are left in a center of the internal electrode layer 12 in a thickness direction. In this case, the grain 15 does not exist in an upper edge portion or a lower edge portion that are 5% range of the internal electrode layer 12. It is therefore preferable that the grain 15 does not exist in the upper edge portion or the lower edge portion that are 5% range of the internal electrode layer 12 in the thickness direction.

Figure 4:
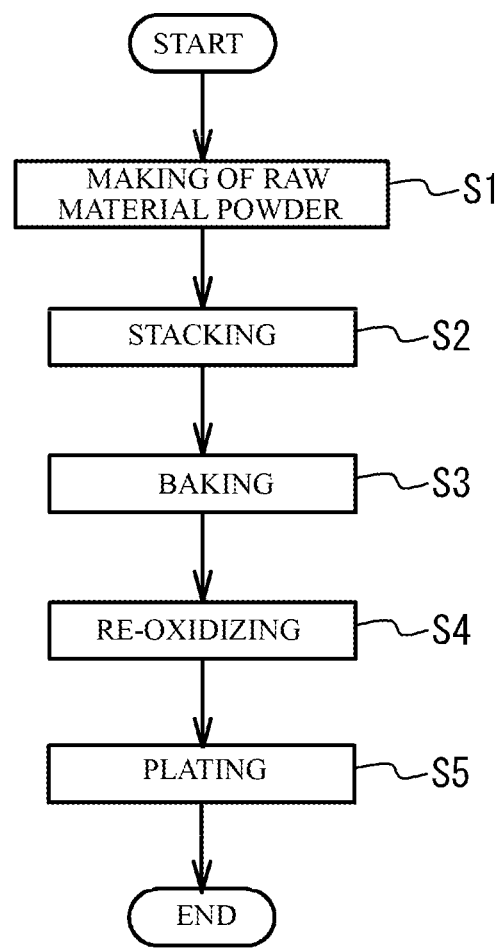
FIG. 4 illustrates a manufacturing method of a multilayer ceramic capacitor.

Next, a description will be given of a manufacturing method of the multilayer ceramic capacitor 100. FIG. 4 illustrates a manufacturing method of the multilayer ceramic capacitor 100.

(Making Process of a Raw Material Powder) As illustrated in FIG. 4, a dielectric material for forming the dielectric layer 11 is prepared. An A site element and a B site element of the dielectric layer 11 are generally included in the dielectric layer 11 in a shape of sintered structure of grains of $ABO_3$. For example, $BaTiO_3$ is tetragonal compound having a perovskite structure and has a high dielectric constant. $BaTiO_3$ can be obtained by reacting a titanium material such as titanium dioxide with a barium material such as barium carbonate and synthesizing barium titanate. Various methods are known as a synthesizing ceramic of the dielectric layer 11. For example, a solid-phase method, a sol-gel method, a hydrothermal method and so on are known. In the embodiment, any one of them can be adopted.

Next, additive compound may be added to a ceramic powder material, in accordance with purposes. The additive compound may be an oxide of Mn (manganese), V (vanadium), Cr (chromium) or a rare earth element (Y (yttrium), Dy (dysprosium), Tm (thulium), Ho (holmium), Tb (terbium), Yb (ytterbium), Sm (samarium), Eu (europium), Gd (gadolinium) and Er (erbium)), or an oxide of Co (cobalt), Ni (nickel), Li (lithium), B (boron), Na (sodium), K (potassium) and Si (silicon), or glass.

In the embodiment, it is preferable that compound including additive compound is mixed with the ceramic grains structuring the dielectric layer 11. The resulting ceramic grains with the additive compound are calcined within a temperature range of 820 degrees C. to 1150 degrees C. Then, the ceramic grains are wet-blended with the additive compound. After that, the ceramic grains with the additive compound are dried and crushed. And, desirable ceramic powder is prepared. For example, it is preferable that an average grain diameter of the ceramic powder is 50 nm to 300 nm from a viewpoint of reducing the thickness of the dielectric layer 11. For example, the grain diameter of the resulting ceramic may be adjusted by crushing the resulting ceramic powder. Alternatively, the grain diameter may be adjusted by performing the crushing and a classifying process.

(Stacking Process) Next, a binder such as polyvinyl butyral (PVB) resin, an organic solvent such as ethanol or toluene, and a plasticizer such as dioctyl phthalate (DOP) are added to the resulting dielectric material and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming an internal electrode layer with use of screen printing or gravure printing. The conductive paste includes an organic binder. Thus, internal electrode layer patterns that are alternately extracted to the pair of external electrodes are provided. A metal material of the metal conductive paste has an average grain diameter of 100 nm or less. A standard deviation of the grain diameter is 15 or less. In this case, sharp grain size distribution is obtained. It is preferable that the average grain diameter is 100 nm or less. It is more preferable that the average grain diameter is 70 nm or less. It is preferable that the standard deviation of the grain diameter is 15 or less. It is more preferable that the standard deviation of the grain diameter is 12 or less. An inclination of accumulated grain size distribution is 8 or more. The inclination of the accumulated grain size distribution can be defined as an inclination (=1/(log D80−log D20)) between D20 and D80 in a case where the accumulated grain size distribution is plotted in a logarithmic manner.

As a co-material, ceramic grains are added to the metal conductive paste. A main component ceramic of the ceramic grains is not limited. However, it is preferable that a main component ceramic of the co-material is the same as that of the dielectric layer 11. For example, barium titanate may be evenly dispersed. For example, ceramic grains of which an average grain diameter is 10 nm or less are used as the co-material. The standard deviation of the grain diameter is 5 or less. Thus, sharp grain size distribution is achieved. It is preferable that the average grain diameter is 15 nm or less. It is more preferable that the average grain diameter is 10 nm or less. It is preferable that the standard deviation of the grain diameter is 5 or less. It is more preferable that the standard deviation of the grain diameter is 3 or less. It is preferable that the inclination of the accumulated grain size distribution is 7 or more. The inclination of the accumulated grain size distribution can be defined as an inclination (=1/(log D80−log D20)) between D20 and D80 in a case where the accumulated grain size distribution is plotted in a logarithmic manner.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are compressed on the stacked dielectric green sheets and under the stacked dielectric green sheets. The resulting multilayer structure is cut into a predetermined size (for example, 1.0 mm×0.5 mm). After that, a metal conductive paste, which is to be the ground layer of the external electrodes 20a and 20b is coated on the both edge faces of the resulting multilayer structure and is dried. Thus, a compact of the multilayer ceramic capacitor 100 is obtained.

(Baking process) Next, after removing the binder in $N_2$ atmosphere at 250 degrees C. to 500 degrees C., the resulting compact is baked for ten minutes to 2 hours in a reductive atmosphere, of which an oxygen partial pressure is $10^{-5}$ to $10^{-8}$ atm, in a temperature range of 1100 degrees C.

to 1300 degrees C. Thus, each compound structuring the dielectric green sheet is sintered and grains of each compound grow. In this manner, the multilayer ceramic capacitor 100 is obtained. It is possible to adjust the amount of the co-materials left in the internal electrode layer 12 by adjusting the baking condition. In concrete, when a speed of temperature increasing in the baking process is enlarged, the main component metal is sintered before the co-material is extruded from the metal conductive paste. Therefore, the co-material tends to exist in the internal electrode layer 12. For example, it is preferable that the average speed of the temperature increasing from a room temperature to a maximum temperature in the baking process is 30 degrees C./minute or more in order to increase the amount of the co-materials left in the internal electrode layer 12. And it is more preferable that the average speed of the temperature increasing is 45 degrees C./minute or more. When the average speed of the temperature increasing is excessive large, an organic component existing in the compact (which is left after the process for removing the binder) is not sufficiently removed. And a defect such as a crack may occur in the baking process. Alternatively, a difference between an inner sintering and an outer sintering in the compact causes insufficient condensing. Therefore, a defect such as reduction of the electrostatic capacity may occur. And so, it is preferable that the average speed of the temperature increasing is 80 degrees C./minute or less. It is more preferable that the average speed of the temperature increasing is 65 degrees C./minute or less.

(Re-Oxidizing Process) After that, a re-oxidizing process may be performed at 600 degrees C. to 1000 degrees C. in $N_2$ gas atmosphere. (Plating process) After that, metal layers such as Cu, Ni or Su are coated on the ground layers of the external electrodes 20a and 20b by a plating process.

With the manufacturing method of the multilayer ceramic capacitor in accordance with the embodiment, a small diameter material of which grain size distribution is sharp is used as the main component metal of the internal electrode layer 12 and the co-material. Therefore, highly distributed metal conductive paste is obtained. And, a partial mixing of a large diameter material is suppressed. When the highly distributed metal conductive paste is used, diffusion of the co-material into the dielectric layer 11 in the baking process is suppressed. And the co-material exists in the internal electrode layer 12. In concrete, the area ratio of the grains 15 in the cross section of the internal electrode layer 12 in the stacking direction of the dielectric layer 11 and the internal electrode layer 12 is 10% or more.

When the co-material exists in the internal electrode layer 12, excessive sintering of the metal component of the internal electrode layer 12 during sintering is suppressed. And a breaking of the internal electrode layer 12 is suppressed. Therefore, a continuity modulus of the internal electrode layer 12 becomes larger. And, the diffusion of the co-material into the dielectric layer 11 is suppressed. The reduction of the dielectric constant c of the dielectric layer 11 is suppressed. And desirable dielectric property can be achieved. It is preferable that the area ratio is 12% or more. It is more preferable that the area ratio is 14% or more. It is preferable that the grain 15 of which the main component is ceramic does not exist in the upper edge portion and the lower edge portion that are 5% range of the internal electrode layer 12 in the thickness direction.

EXAMPLES

The multilayer ceramic capacitors in accordance with the embodiment were made and the property was measured.

Examples 1 to 5 A necessary additive compound was added to a barium titanate powder of which an average grain diameter was 100 nm (a specific surface area of 10 $m^2/g$). The resulting barium titanate powder was sufficiently wet-blended and crushed with a ball mil. Thus, the dielectric material was obtained. An organic binder and a solvent were added to the dielectric material. And dielectric green sheets were made by a doctor blade method. A thickness of the dielectric green sheet was 0.8 μm. The organic binder was polyvinyl butyral (PVB) resin or the like. The solvent was ethanol, toluene or the like. And a plasticizer and so on were added.

Next, the conductive paste for forming the internal electrode layer was formed by a planetary boll mill. The conductive paste included a main component metal (Ni) powder of the internal electrode layer 12 (50 wt % of Ni solid content), 10 weight part of a co-material (barium titanate), 5 weight part of binder (ethyl cellulose), a solvent and an auxiliary as needed. As shown in Table 1, the average grain diameter of the main component metal powder was 70 nm (a specific surface area was 10 $m^2/g$). The standard deviation of the grain diameter of the main component metal powder was 12. The inclination of the accumulated grain size distribution was 8. The average grain diameter of the co-material was 8.6 nm (a specific surface area was 110 $m^2/g$). The standard deviation of the grain diameter of the co-material was 2.7. The inclination of the accumulated grain size distribution of the co-material was 7.

TABLE 1

|  |  | AVERAGE GRAIN DIAMETER | STANDARD DEVIATION | INCLINATION OF ACCUMULATED GRAIN SIZE DISTRIBUTION |
|---|---|---|---|---|
| EXAMPLES 1 TO 5 | MAIN COMPONENT METAL | 70 nm | 12 | 8 |
|  | CO-MATERIAL | 8.6 nm | 2.7 | 7 |
| COMPARATIVE EXAMPLES 1 TO 3 | MAIN COMPONENT METAL | 120 nm | 33 | 6 |
|  | CO-MATERIAL | 29 nm | 8.7 | 5 |

The conductive paste for forming the internal electrode layer was screen-printed on the dielectric green sheet. 250 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in $N_2$ atmosphere. After that, the metal paste including the metal filler of which a main component was Ni, the co-material, the binder and the solvent was coated from the both edge faces to the side faces of the ceramic multilayer structure and was dried. After that, the resulting multilayer structure was baked together with the metal paste for 10 minutes to 2 hours in a reductive atmosphere in a temperature range of 1100 degrees C. to 1300 degrees C. And, a sintered structure was formed. The average speed of temperature increasing from a room temperature to a maximum temperature was 30 degrees C./minute in the example 1, 45 degrees C./minute in the example 2, 55 degrees C./minute in the example 3, 65 degrees C./minute in the example 4 and 80 degrees C./minute in the example 5.

The resulting sintered structure had a length of 0.6 mm, a width of 0.3 mm and a height of 0.3 mm. The sintered structure was subjected to a re-oxidation process at 800 degrees C. in $N_2$ atmosphere. After that, by a plating process, a Cu-plated layer, a Ni-plated layer and a Sn-plated layer were formed on a surface of a ground layer. And, the multilayer ceramic capacitor 100 was obtained.

Comparative Examples 1 to 3 In comparative examples 1 to 3, as shown in Table 1, an average grain diameter of a main component metal powder (Ni) of the conductive paste for forming the internal electrode layer was 120 nm. A standard deviation of the grain diameters of the powder was 33. An inclination of accumulated grain size distribution of the powder was 6. An average grain diameter of a co-material was 29 nm. A standard deviation of the grain diameters of the co-material was 8.7. An inclination of accumulated grain size distribution of the co-material was 5. An average speed of temperature increasing from a room temperature to a maximum temperature was 45 degrees C./minute in the comparative example 1, 55 degrees C./minute in the comparative example 2 and 65 degrees C./minute in the comparative example 3. Other conditions were the same as those of the examples 1 to 5.

Figure 5A:
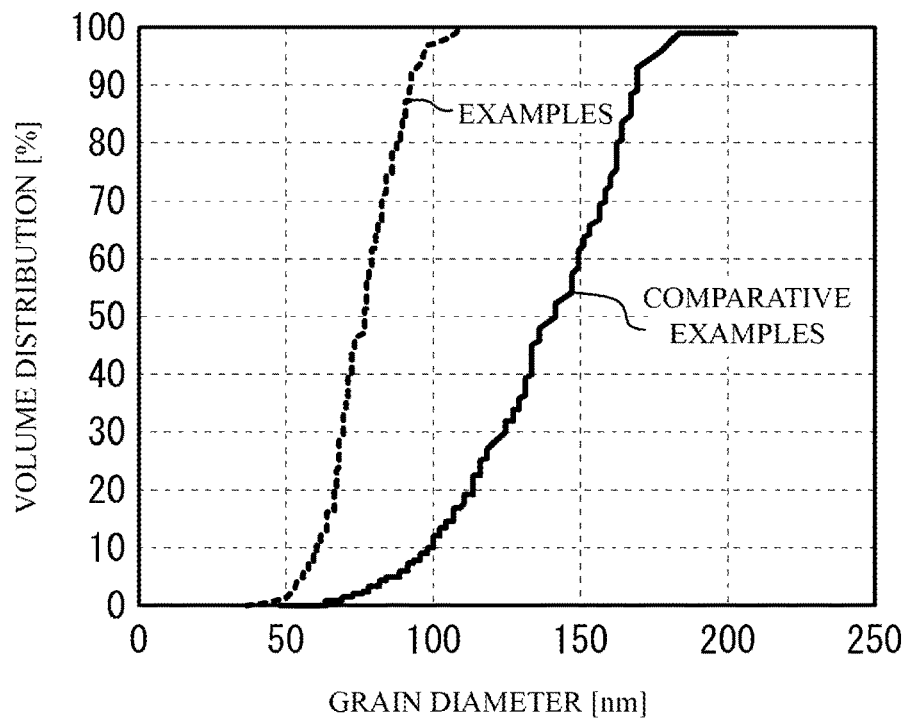
FIG. 5A illustrates grain size distribution of a main component metal of a conductive paste for forming an internal electrode of examples and comparative examples.
Figure 5B:
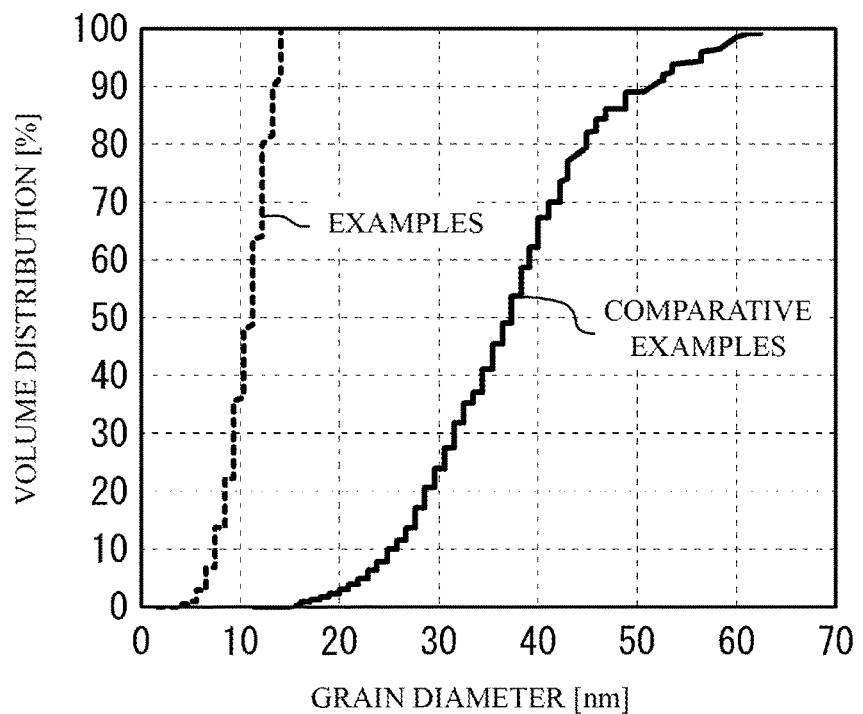
FIG. 5B illustrates grain size distribution of co-materials of a conductive paste for forming an internal electrode of examples and comparative examples.

FIG. 5A illustrates grain size distribution of the main component metal of the conductive paste for forming the internal electrode layer of the examples 1 to 5 and grain size distribution of the main component metal of the conductive paste for forming the internal electrode layer of the comparative examples 1 to 3. As illustrated in FIG. 5A, in the examples 1 to 5, a metal powder of which the average grain diameter was small and of which grain size distribution was sharp was used. In the comparative examples 1 to 3, a metal powder of which the average grain diameter was large and of which the grain size distribution was broad was used. FIG. 5B illustrates the grain size distribution of the co-material of the conductive paste for forming the internal electrode layer of the examples 1 to 5 and the co-material of the conductive paste for forming internal electrode layer of the comparative examples 1 to 3. As illustrated in FIG. 5B, in the examples 1 to 5, the average grain diameter of the co-material was small, and the grain size distribution of the co-material was sharp. In the comparative examples 1 to 3, the average grain diameter of the co-material was large, and the grain size distribution of the co-material was broad.

Figure 6A:
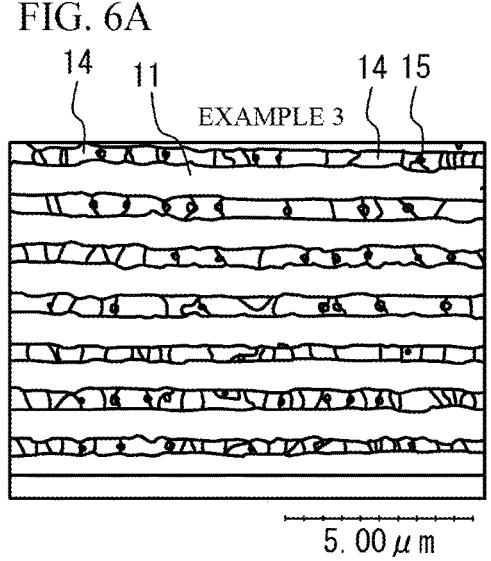
FIG. 6A and FIG. 6B illustrate SEM images of cross sections of a dielectric layer and an internal electrode layer in a stacking direction.
Figure 6B:
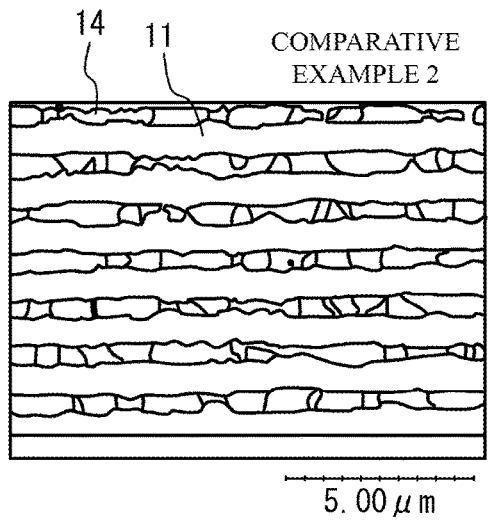
Figure 6C:
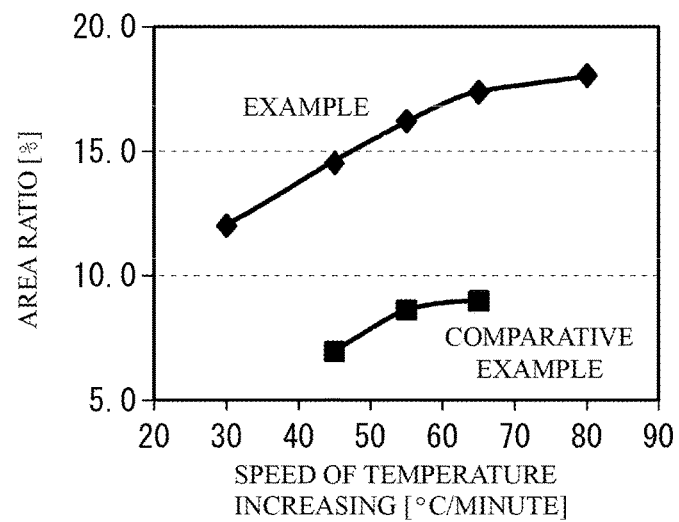
FIG. 6C an area ratio of grains of which a main component is ceramic.

(Analysis) FIG. 6A and FIG. 6B illustrate SEM (Scanning Electron Microscope) images of cross sections of a center portion in a width direction of the dielectric layer 11 and the internal electrode layer 12, in the stacking direction of the dielectric layer 11 and the internal electrode layer 12. FIG. 6A illustrates a SEM image of the example 3. FIG. 6B illustrates a SEM image of the comparative example 2. From the results of FIG. 6A and FIG. 6B, the area ratio of the grains 15 in the cross section of the internal electrode layer 12 in the stacking direction of the dielectric layer 11 and the internal electrode layer 12 was measured. In concrete, the number of the grains 15 was counted from the SEM image. Each grain diameter of the grains 15 was measured. And the area ratio was calculated by calculating the total area of the grains 15 with respect to the total area of the internal electrode layer 12 (including the grains 15). A field of view of the SEM images was 12.6 μm×8.35 μm. As illustrated in FIG. 6C and FIG. 7, the area ratio was 12.0 in the example 1. The area ratio was 14.5 in the example 2. The area ratio was 16.2 in the example 2. The area ratio was 17.3 in the example 4. The area ratio was 18.0 in the example 5. The area ratio was 7.0 in the comparative example 1. The area ratio was 8.7 in the comparative example 2. The area ratio was 9.0 in the comparative example 3.

With use of the SEM images, the continuity modulus explained with FIG. 2 was measured. In the examples 1 to 5, the continuity modulus was 100%. In the comparative examples 1 to 3, the continuity modulus was 94% to 96%. The continuity modulus was obtained by calculating an average of continuity moduluses of all internal electrode layers included in a few of the SEM images.

Next, dielectric constants of samples of the multilayer ceramic capacitors of the examples 1 to 5 and the comparative example 1 to 3 were evaluated. In concrete, electrostatic capacitors were measured with use of an LCR meter 4282A made by Hewlett-Packard. Superficial dielectric constants were calculated from the measured dielectric constants, a crossing area of internal electrode layers of the multilayer ceramic capacitors, a thickness of dielectric ceramic layers, and the number of stacking. The number of the samples was 100.

Figure 8:
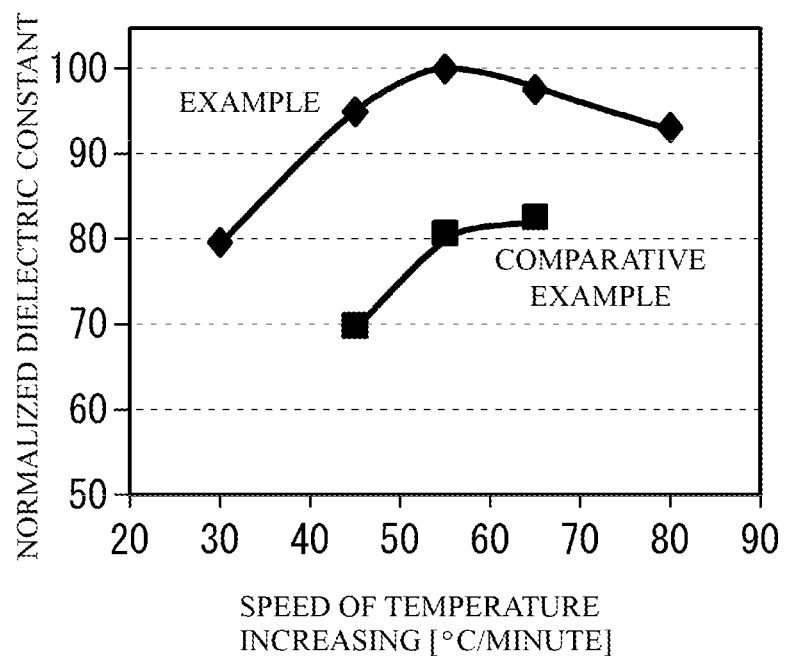
FIG. 8 illustrates a graph of evaluated results of dielectric constants.

The dielectric constants were measured with respect 100 samples of the examples 1 to 5 and the comparative examples 1 to 3. FIG. 8 illustrates measured results of the dielectric constants. A vertical axis of FIG. 8 indicates a dielectric constant of each sample. In FIG. 8, normalized electrostatic capacity is shown on a presumption that an average of the dielectric constants of the samples of the example 3 is 100%.

From the results of FIG. 8, the dielectric constants of the examples 1 to 5 were larger than those of the comparative examples 1 to 3 by 20% or more, with respect to the same speed of temperature increasing. This is because the small diameter material of which grain size distribution was sharp was used as the metal material of the metal conductive paste for forming the internal electrode layer, the co-material existed in the internal electrode layer 12 during the sintering, the diffusion of the co-material into the dielectric layers 11 was suppressed, and the shifting of the A/B ratio and the composition of the materials in the dielectric layers 11 was suppressed.

Although the embodiments of the present invention have been described in detail, it is to be understood that the various change, substitutions, and alterations could be made hereto without departing from the spirit and scope of the invention.

What is claimed is:
1. A multilayer ceramic capacitor comprising:
  a multilayer structure in which each of dielectric layers and each of internal electrode layers are alternately stacked, a main component of the dielectric layers being ceramic, a main component of the internal electrode layers being a metal,
  wherein:

at least one of the internal electrode layers includes grains of which a main component is ceramic; and an area ratio of a total area of the grains to a total area of the at least one of the internal electrode layers in a cross section of the at least one of the internal electrode layers in a stacking direction of the dielectric layers and the internal electrode layers is 12% or more.

2. The multilayer ceramic capacitor as claimed in claim 1, wherein the main component of the internal electrode layers is nickel.

3. The multilayer ceramic capacitor as claimed in claim 1, wherein the main component of the grains is barium titanate.

4. The multilayer ceramic capacitor as claimed in claim 1, wherein the main component of the dielectric layers is barium titanate.

5. The multilayer ceramic capacitor as claimed in claim 1, wherein the area ratio is calculated from a total area of 10 internal electrode layers that are arbitrarily selected from a SEM image of a cross section of the internal electrode layers and a total area of the grains in the 10 internal electrode layers.

6. The multilayer ceramic capacitor as claimed in claim 1, wherein the grains are enclosed by the internal electrode layer.

7. A manufacturing method of a multilayer ceramic capacitor comprising:

a first step of forming a pattern of a metal conductive paste on a green sheet including ceramic powders, a main component of the metal conductive paste being metal powders of which an average grain diameter is 100 nm or less and of which a standard deviation of grain size distribution is 15 or less, the metal conductive paste including ceramic powders as a co-material, an average grain diameter of the co-material being 10 nm or less, a standard deviation of grain size distribution of the co-material being 5 or less; and a second step of forming internal electrode layers by sintering the metal powders and forming dielectric layers by sintering the ceramic powders of the green sheet, by baking a ceramic multilayer structure obtained by stacking a plurality of layer units obtained by the first step, wherein:

at least one of the internal electrode layers includes grains of which a main component is ceramic; and an area ratio of a total area of the grains to a total area of the at least one of the internal electrode layers in a cross section of the at least one of the internal electrode layers in a stacking direction of the dielectric layers and the internal electrode layers is 12% or more.

8. The method as claimed in claim 7, wherein an average speed of temperature increasing from a room temperature to a maximum temperature is 30 degrees C/minute to 80 degrees C/minute in the second step.

9. The method as claimed in claim 7, wherein a main component of the metal powders is nickel.

10. The method as claimed in claim 7, wherein a main component of the co-material is barium titanate.

11. The method as claimed in claim 7, wherein a main component of the ceramic powders of the green sheet is barium titanate.

12. The method as claimed in claim 7, wherein the area ratio is calculated from a total area of 10 internal electrode layers that are arbitrarily selected from a SEM image of a cross section of the internal electrode layers and a total area of the grains in the 10 internal electrode layers.

* * * * *